United States Patent [19]
Gschwend et al.

[11] Patent Number: 5,899,647
[45] Date of Patent: May 4, 1999

[54] SECURING COMPONENT AND METHOD OF ANCHORING IT

[76] Inventors: Hans Gschwend, Neugutgrabenstrasse 7, CH-9470 Buchs, Switzerland; Kai-Uwe Keller, Dorfstrasse 7, A-6800 Feldkirch-Tisis, Austria

[21] Appl. No.: 08/983,402

[22] PCT Filed: May 9, 1997

[86] PCT No.: PCT/EP97/02386

§ 371 Date: Jan. 20, 1998

§ 102(e) Date: Jan. 20, 1998

[87] PCT Pub. No.: WO97/45646

PCT Pub. Date: Dec. 4, 1997

[30] Foreign Application Priority Data

May 24, 1996 [DE] Germany ............... 196 20 955

[51] Int. Cl.[6] .................................................. F16D 2/20
[52] U.S. Cl. ........................... 411/29; 411/387; 411/514; 411/31
[58] Field of Search ........................ 411/29, 30, 31, 411/387, 513, 514

[56] References Cited

U.S. PATENT DOCUMENTS

| | | | |
|---|---|---|---|
| 1,429,033 | 9/1922 | Harris | 411/29 |
| 2,240,425 | 4/1941 | Sternbergh | 72/105 |
| 4,395,174 | 7/1983 | Freeman | 411/387 |
| 4,702,654 | 10/1987 | Frischmann et al. | 411/31 |
| 4,881,861 | 11/1989 | Hewison | 411/387 |
| 4,990,042 | 2/1991 | Szayer et al. | 411/29 |
| 5,066,181 | 11/1991 | Bogel | 411/387 |
| 5,246,323 | 9/1993 | Vernet et al. | 411/29 |
| 5,536,121 | 7/1996 | McSherry | 411/31 |
| 5,743,690 | 4/1998 | Royle | 411/387 |

*Primary Examiner*—Carl D. Friedman
*Assistant Examiner*—Phi Dieu Tran A
*Attorney, Agent, or Firm*—Anderson, Kill & Olick, P.C.

[57] ABSTRACT

An attachment member (31) includes a tubular metallic shank (2) with an axial through-bore (3) and a slot (8) formed in the jacket of the shank (2) and extending along the entire length of the shank (2), and load application means (14) at the trailing, in the setting direction, end portion (13) of the shank (2). At an opposite, leading end (6) of the shank (2), cutters (7) are provided. The outer diameter of the shank (2) diminishes from the trailing end (4) toward the cutter carrying leading end (6). The shank (2) is anchored in a constructional component by reduction of its outer diameter over a substantial portion of its longitudinal extent.

10 Claims, 3 Drawing Sheets

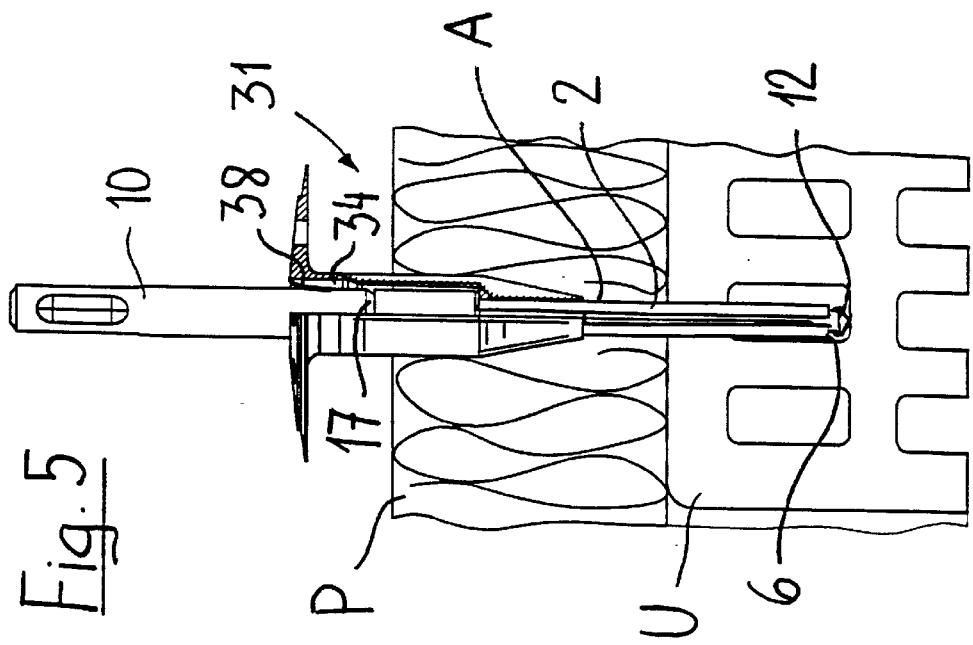
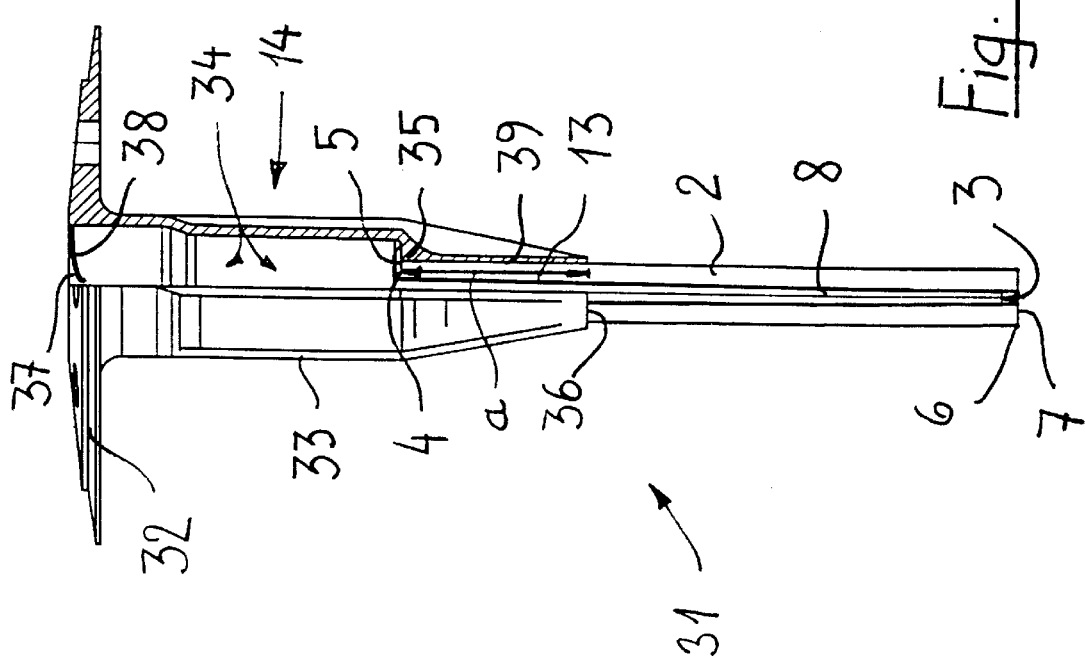

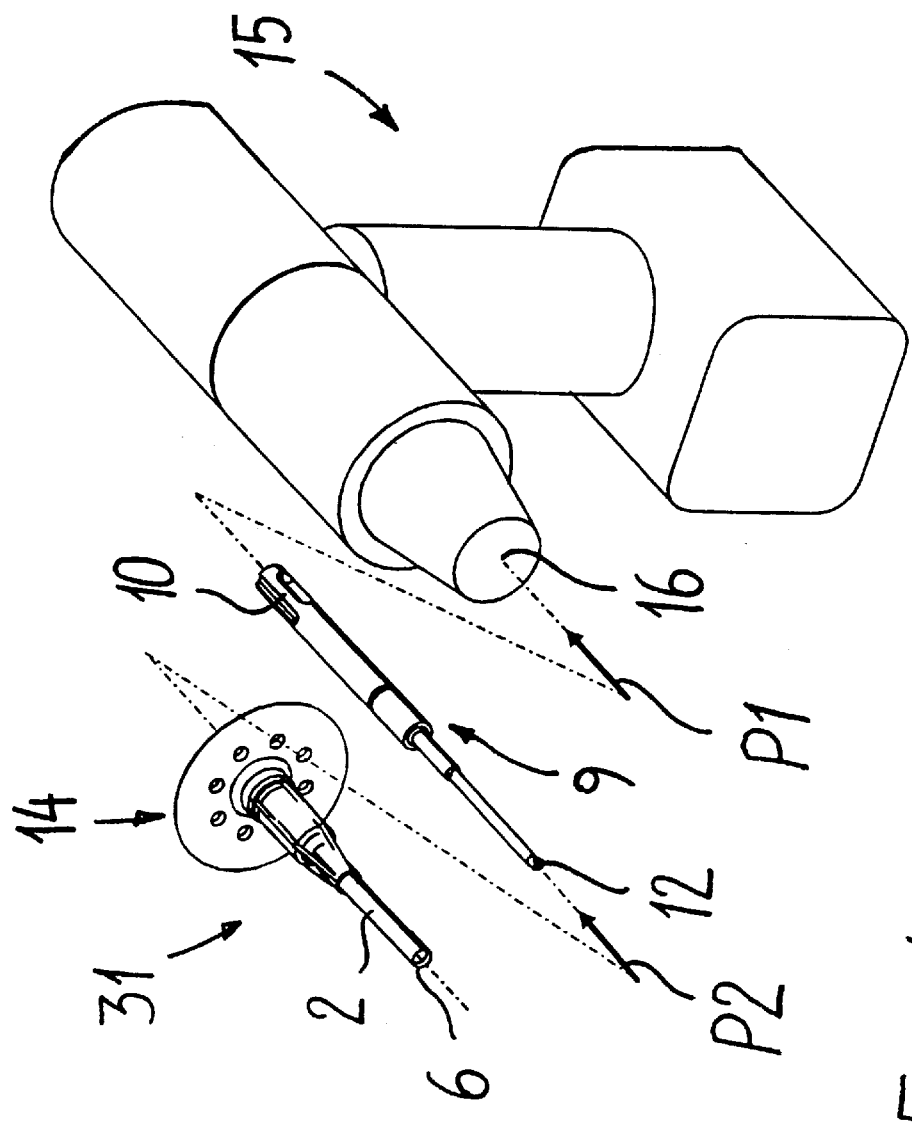

SECURING COMPONENT AND METHOD OF ANCHORING IT

BACKGROUND OF THE INVENTION

The present invention relates to an attachment member with a tubular shank the trailing, in the setting direction, end of which is provided with load application means. The invention also relates to a method of anchoring such an attachment member.

For effecting attachments to different solid constructional components, different methods are used. The -most common are sequential method and a method of direct mounting technology. The sequential method is suitable for all types of constructional components. Dependent on the type of a component and a desired degree of attachment, different attachment members are used. With a sequential method, a receiving bore is formed in a constructional component with a drilling device. The drilling device consists of a metal rotary or wood drill driven by a hand-held tool having a power rotary drive and, if necessary, impact application means. After a receiving bore is formed, an attachment member, usually a dowel, is inserted into the bore and is anchored in the bore, in most cases, by being expanded by screwing-in a screw or driving-in a mandrel. As mechanical attachment members, plastic or metal mandrels having a head can be used, which are driven in a prepared bore with a hammer. The retaining mechanism is primarily based on frictional engagement and, for perforated brick structures, sometimes on a form-locking connection.

With a direct mounting technology, special attachment members are directly driven into the component with powder explosion driven setting tools. With this attachment method, the step of separately forming the receiving bore is eliminated. The direct mounting technology is a rapid method and results in attachment with a high retention force. Generally, the known direct mounting technology is suitable for more or less ductile constructional components, e.g., such as steel, lime base, concrete, if necessary, wood.

Less strong or brittle constructional component, e.g., such as brick masonry, are very much affected by the powder explosion driven setting tools, which are used with the conventional direct mounting technology, and are often so damaged that no acceptable attachment takes place. Therefore, for anchoring in these constructional components, essentially only the sequential attachment method is used. It does not affect the constructional component and results in an acceptable attachment with desired retention values. Generally, a significantly larger expenditure of time for each attachment should be taken into consideration. In addition, separate devices for forming the receiving bores and for anchoring of attachment members or members are necessary. E.g., a drill tool with drilling means is necessary for drilling a bore, and a screwing tool for screwing a connection screw into a dowel, with the dowel being anchored by being expanded.

For attachment of insulation panels or for laying down cables or pipes in a constructional component, the attachment member is provided with specially formed load application means. German publication No. 4,432,780 of the assignee herein discloses load application means which is used, for example, for laying down cables or insulation pipes during electrical works. It has a base and an arched shackle projecting therefrom. In the base, a bore is formed through which an attachment member is driven into the constructional component. European Publication 0 492 230 and corresponding U.S. Pat. No. 5,171,118 disclose an attachment arrangement for insulation panels, wall paneling and the like. The attachment arrangement includes an attachment member for anchoring in constructional component and load application means with a large-area head. From the head, a shank member projects which has an axial passageway with an abutment for the attachment member extending through the passageway. The passageway opens at the head and is closed, e.g., with reversible resilient lamellas. The mechanical attachment of insulation panel, e.g., when heat insulation connection systems are used, is used either along or in addition to gluing of the panels.

When the constructional component is formed by more or less brittle brick masonry, only the sequential attachment method is conventionally used for an attachment. Expansion dowels or plastic or metal mandrels are usually used as mechanical attachment members, which are provided with a large-area head, and are inserted and anchored in the preliminary prepared bore. When an insulation panel is being attached, it is rather difficult to find the receiving bore behind the insulation panel. This results in a loss of time, troubles, damaged dowels, which should be anchored, and so forth. Often, forming of a new receiving bore is required. Further drawback consists in that during a sequential mounting of the insulation panel, the quality of attachment during mounting cannot be controlled. Usually, the trailing end of the plastic or metal mandrel or its head is struck with a hammer until it becomes flush with the outer surface of the insulation panel. It becomes, as a result of hammer blows, plastically deformed. The head indeed becomes flush with the insulation panel and is slightly submerged in the material of the insulation panel. However, the operator is not sure whether the connection means secured the insulation panel to the constructional component with a required minimal retention force. The setting results can usually be determined only with pull-out devices.

SUMMARY OF THE INVENTION

Therefore, a need has existed for an attachment member which could be quickly and reliably anchored in less strong or brittle material such, e.g., as brick masonry. In the same way, a method was needed with which the sequence of forming a receiving bore and then setting of an attachment member in the bore and, if necessary, expansion of the attachment member can be eliminated. The need for the use of different devices for forming the receiving bore and for anchoring of the attachment member likewise should be eliminated. At that, the constructional component should not be affected, and an attachment with the required retention force should be achieved.

When the insulation panel is being attached, laborious search for the prepared receiving bore should be eliminated. The attachment should have an allowable retention force, and falling-out should be prevented.

The foregoing objects are achieved with an attachment member specifically in the present invention there is provided an attachment member including a tubular metallic shank with an axial through-bore and an axial slot formed in the shank jacket and extending along the entire length of the shank, and load application means at the trailing, in a setting direction, end portion of the shank. At the leading end of the shank, there are provided cutters extending annularly around the leading end. The outer diameter of the shank narrows from its trailing end toward its leading end. The narrowing of the outer diameter of the shank provides for the shank anchoring in the constructional component along a substantial portion of the longitudinal extent of the shank. The construction of the attachment member according to the present invention provides prerequisites for the attachment method. At that, a drill is inserted through the axial bore of the shank, with the drill bit projecting beyond the shank leading end and having a diameter smaller than the inner diameter of the shank bore. The attachment member has a size exceeding that of the receiving bore, which is being formed, and is anchored, in particular clamped, in the receiving bore synchronously with drilling of the bore by being percussion driven into the receiving bore. The anchoring of the attachment member in the receiving bore is effected by clamping it therein which results from the size of the attachment member being greater than the receiving bore size. A radial compression acting against the spring force of the attachment member generates a radial force which, together with the friction coefficient of an abutting surface, permits to achieve the desired retention value. After the attachment member has been anchored in the constructional component, the drill is withdrawn from the shank bore.

The attachment member according to the present invention permits to provide attachment points with the inventive method in a weaker or brittle constructional component, such as, e.g., brick masonry, by using the direct mounting technology. In effect, the attachment member is being anchored in the receiving bore simultaneously with the formation of the receiving bore. This simplifies the entire operational process of providing attachment points and noticeably reduces the total time of forming an attachment point. The formation of attachment points with the attachment member according to the present invention by using the attachment method according to the present invention does not require different devices for forming the receiving bore and for setting and anchoring of the attachment member. The formation of the receiving bore and setting of the attachment member is effected with the same device. E.g., the device here is a percussion drilling device to which a drill is attached. The formation of the bore is effected with a rotatable drill, with the attachment member being synchronously driven into the constructional component by axial impacts. At that, the shank and the drill become decoupled from each other. The trailing end of the shank of the attachment member advantageously abuts a stop shoulder in the drilling tool. The attachment member according to the present invention is convenient in use and has an advantage of allowing a quick formation of attachment points by the use of the direct mounting technology while insuring gentle treatment of the constructional component which characterizes the sequential method. The invention permits to provide attachment points in a less strong or brittle constructional component with the speed and productivity inherent in the direct mounting technology.

Advantageously, the shank is provided at its trailing end with a plate spring-like collar which extends substantially radially. The flange-like collar serves, e.g., for supporting the attachment member on a stationary structural element or for fixing a specially formed load application element to the constructional component. Because the collar has elasticity of a plate spring, a prestress force needs to be used to press the collar flush against an adjacent surface. This prestress force simultaneously defines the minimal retention force which insures anchoring of the shank in a constructional component. These simple constructional features permits to control in a simple way whether the attachment member has been set correctly.

It is advantageous when the maximal width of the slot, when measured along the inner wall of the shank, is about 25 to 50% of the outer diameter of the shank in the region of its trailing end. This reliably provides that a sufficient free space is available for radial compression of the tubular shank, on one hand, and on the other hand, that a sufficient abutment surface remains for engaging the receiving bore wall to achieve a sufficiently high friction force which is obtained by the combined action of the spring force resulting from the radial compression of the shaft and of the friction coefficient.

Because the width of the slot diminishes from the trailing end of the shank toward its leading end, the attachment member can be formed with a slightly conical shape which insures that it can be particularly easily inserted into synchronously drilled bore. At that, the conical shape compensates, in particular in a weakened constructional component, a possible abrasion of the receiving bore wall as a result of a setting process, so that the shank abuts the wall of the receiving bore with substantially the same contact pressure along the entire anchoring depth.

To insure the necessary diameter relationship between the leading end of the shank and the drilling head of the drill, the slot can advantageously be closed in the region of the leading end of the shank with a weld point or the like. With this constructive measure, the diameter of the receiving bore is calibrated by being chiseled or shaved by the annularly cutters.

Preferably, the attachment member is equipped with load application means having a base and a substantially arched receiving shackle projecting from the base, with the base having a through-bore for the shank. Such an attachment member can be used, e.g., in electrical works for laying down cables or light pipes on a constructional component. Usually, the load application means is formed of a plastic material which facilitates its mass production, e.g., makes possible its manufacture with an injection-molding process.

In another particularly advantageous embodiment of the attachment means, which is used for attachment of insulation panels, the load application means includes a large-area head and a shank member therefrom. The head and the shank member are pierced with a passageway having an abutment for the trailing portion of the shank of the attachment member. Flexible closing elements, preferably flexible segments projecting toward the center, are provided in the head-side mouth region of the passageway. The head portion and the shank member of the load application means are advantageously formed of a plastic material and can, therefore, be easily mass-produced with an injection-molding process. The attachment member according to the present invention, together with the attachment method according to the present invention, permits attachment of insulation panels to brittle constructional components by using the direct mounting technology. For attaching an insulation panel, a drill, which is secured in a hand-held power tool, is inserted through the bore of the attachment member until the drilling head projects beyond the cutter-carrying leading end of the shank. The entire mounting block, which consists of a hand-held tool, a drill, and an attachment member, is pressed against the constructional component through the insulation panel. Upon actuation of the hand-held tool, the drill starts to form a receiving bore in the constructional component. As soon as the cutter-carrying leading end of the shank of the attachment member contacts the constructional component, it is driven into the bore with axial impacts. In this way, the receiving bore is being continuously formed, and simultaneously the shank of the attachment member is driven into the constructional component. The longitudinally slotted shank has a size exceeding that of the receiving bore. Therefore, it is radially compressed as it is being driven into the bore. The hollow shank forms a radial guide for the drill. The shank, which is supported against abutment, pulls into the material of the insulation panel, as it is being driven into the bore, the load application means, which includes a head and a shank member, until the large-area head portion abuts the outer surface of the panel, preferably flush therewith.

It is advantageous when the abutment is formed by a shoulder provided in the passageway of the shank member and is spaced from the leading end of the shank portion by a distance from about 8 mm to about 25 mm. In this way, cold bridges through the metallic shank are minimized. On the other hand, the connection region between the shank and the load application means has a sufficient stability to withstand application of transverse forces.

While during the effecting of the attachment process according to the present invention, which is conducted with a masonry or rock drill, the drill can be protected and can be withdrawn after the completion of the setting process, according to an embodiment of the attachment process, the leading, in the setting direction, end of the attachment member can be provided with a drill nib, releasably connected therein, and with which a leading end of a pin, which extends through the axial bore of the attachment member, can be connected for joint rotation therewith. During the setting process, the drill nib forming the receiving bore is brought to the leading end of the attachment member and engages it from outside, while being rotationally decoupled therefrom. When the pin is axially withdrawn from the axial bore of the attachment member, it is separated from the drill nib. At that a certain minimal force need be applied to effect pin withdrawal, and it remains in the receiving bore in which the attachment element is anchored. Because of the necessity to apply a certain minimal force to break the connection between the drill nib and the pin, the withdrawal process can simultaneously be used for controlling, e.g., of poorly anchored attachment points in the masonry (for controlling setting results).

BRIEF DESCRIPTION OF THE DRAWINGS

The invention will now be explained in detail on the basis of exemplary embodiments with reference to schematic illustrations thereof. It is shown in, at different scales:

FIG. 3 an elevational, partially cross-sectional view of a third embodiment of an attachment member with load application means which is formed in particular for attachment of insulation panels or wall sheathing;

FIG. 4 an exploded view of a mounting block including the attachment member shown in FIG. 3, a drill and a hand-held tool; and FIG. 5 an elevational partially cross-sectional view of the attachment member, which extends through an insulation panel and is partially anchored in the ground, with a through drill.

DETAILED DESCRIPTION OF THE INVENTION

Figure 1:
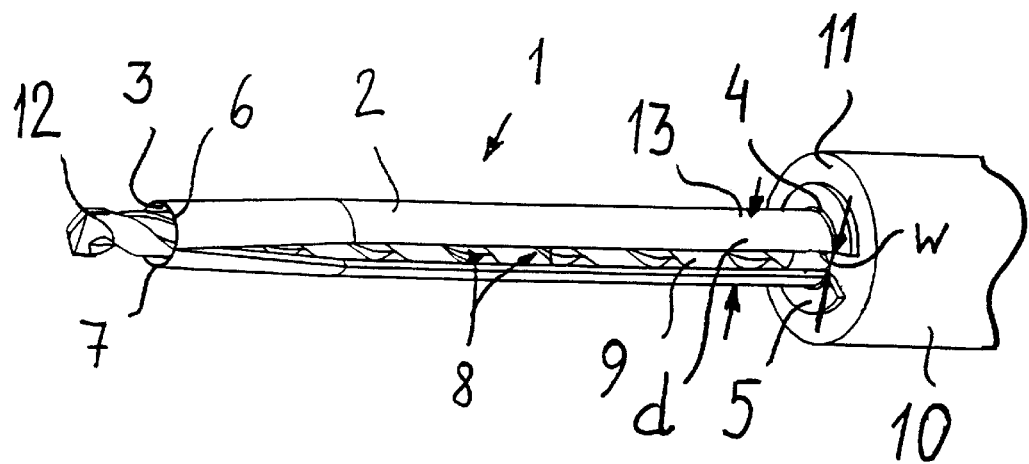
FIG. 1 a perspective view of a first embodiment of an attachment member according to the invention with a through drill.

FIG. 1 shows a first embodiment of an attachment member according to the invention, which is designated with a reference numeral 1. It includes a tubular shank 2 which is provided with a through-bore 3. At its trailing, in the setting direction, end 4, the shank 2 is provided with a flange-like collar 5 which, advantageously, has a resiliency of a plate spring. Extending annularly around its opposite, leading end 6, the shank 2 has cutters 7 which are formed for effecting shaving or chiseling of the edge zone of a formed receiving bore. The shank 2 has an axially extending slot 8 which extends along an entire length of the shank 2. The slot 8 narrows in the region of the cutters 7, and it can be closed, e.g., with a weld point. In this way, on the whole, a slightly conical shape of the attachment member is obtained, with the outer diameter d of the shank 2 at its trailing end 4 being larger than at the opposite leading end 6. The elongated slot 8 has, in the region of the trailing end 4 of the shank 2, a width W, which is measured along the inner wall of the through-bore 3 and which is equal from about 25% to about 50% of the outer diameter d of the shank 2 in this region.

A drill 9, which extends through the axial through-bore 3 of the shank 2, projects from both the leading end 6 and the trailing end 4 of the attachment member 1. At the trailing end 4, a shank 10 of the drill 9 projects from the through-bore 3, providing for fastening of the drill 9 in a chuck of a hand-held tool (not shown). The trailing end 4 of the shank 2 of the attachment member 1, which has the collar 5, abuts a shoulder 11 of the drill 9 and, during the operation, is supported against the shoulder 11 for transmitting axial impacts, which are generated by the hand-held tool, to the attachment member 1. The drill 9 has a drilling head 12 which projects beyond the leading end 6 of shank 2, which is provided with the cutters 7, by several mm, e.g., from about 5 mm to 10 mm. The largest diameter of the drilling head 12 is slightly smaller than the inner diameter of the through-bore 3 at the leading end 6 of the shank 2.

During the setting process, the drilling head 12 projects ahead of the cutters 7, which are provided at the leading end 6 of the shank 2, by a predetermined amount and forms a receiving bore the diameter of which corresponds to the largest diameter of the drill head 12. As soon as the attachment member 1 abuts the ground, or receiving material it is driven into the receiving material, synchronously with the formation of the receiving bore, by axial impacts transmitted from the hand-held tool to the trailing end 4 of the shank 2. The outer diameter of the shank 2 has, at the leading end, a dimension exceeding the diameter of the receiving bore. Therefore, the cutters 7, which are provided at the leading end 6 of the shank 2, shave or chisel the edge zone of the receiving bore as the attachment member 1 is driven in. The diameter of the so calibrated receiving bore corresponds essentially to the outer diameter of the shank 2 in the region of the cutters 7. Because the outer diameter of the shank 2 increases toward the trailing end 4 of the shank 2, the attachment member 1, upon being driven in, becomes radially compressed due to the resiliency of the material it is made of, and is anchored in the receiving bore due to its clamping. This effective clamping force, which is already generated shortly after the start of the process of axial driving-in, results in decoupling of the usually rotatable drill 9 and the attachment member 1.

Figure 2:
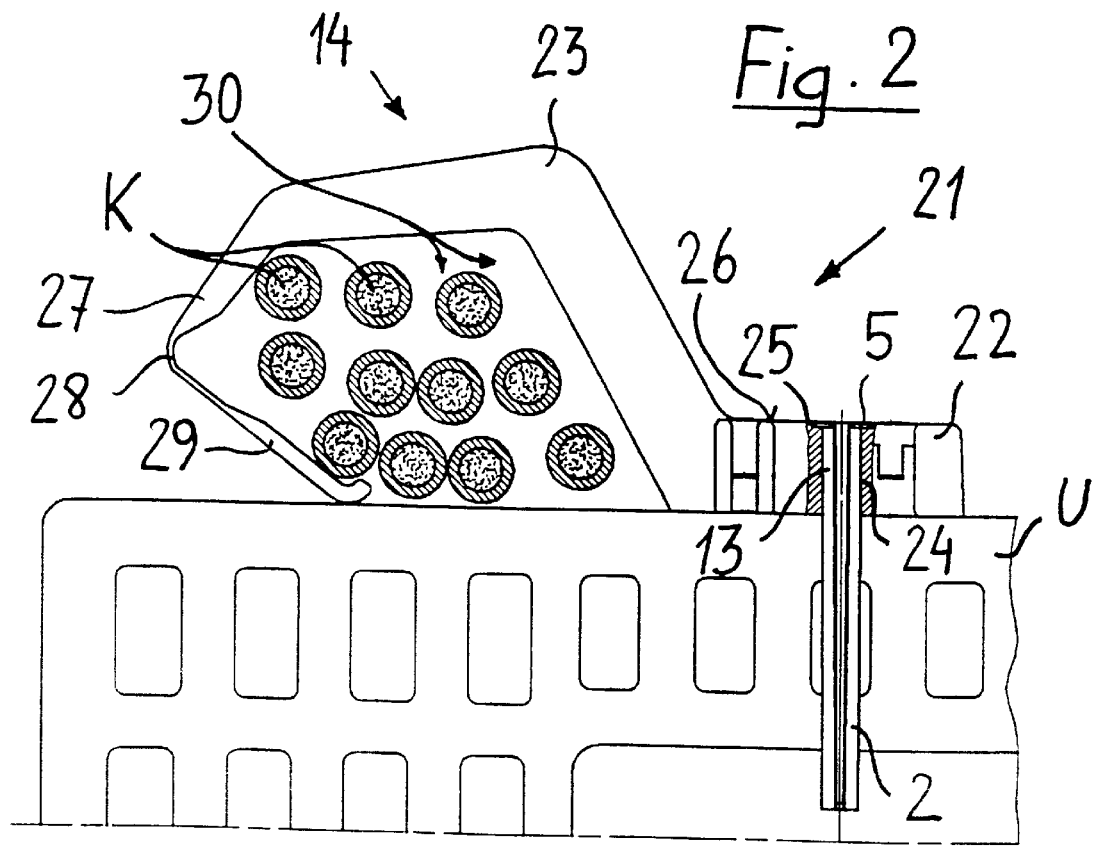
FIG. 2 an elevational, partially cross-sectional view of a second embodiment of an attachment member with load application means particularly suitable for mounting electrical elements.

The attachment member 1 has, at the trailing end portion 13 of the shank, load application means 14. It can be, e.g., an inner thread, holes in the jacket of the shank 2, clips extending from a collar and the like. In the embodiment of an attachment member which is shown in FIG. 2 and is generally designated with a reference numeral 21, the load application means 14 includes a base 22 and a substantially arched receiving shackle or clamp 23 projecting from the base 22. The base 22 has a bore 24 for the shank 2. A countersunk recess 25 in the outer surface 26 of the base 22 serves as an abutment for the plate spring-like collar 5 at the trailing end 4 of the shank 2. At the free end portion 29 of the somewhat arched shackle or clamp 23, which is opposite to the base 22, a hinge 28 is formed. The free end portion 29 of the receiving shackle 23 projects into a space 30 limited by the receiving shackle 23. In order to insert a cable K or a pipe, the end portion is turned into the receiving space away from the constructional component. The base and the receiving shackle are advantageously injection-molded from a plastic material. The hinge 28 can be formed in this case as a living (integral) hinge. The drawing shows this, particularly suitable for mounting of electrical elements, attachment member in a condition, in which it is anchored in the ground, with already inserted cable K. As an example of a brittle ground or receiving material a perforated brick structure is shown.

An attachment member 31, which is shown in FIG. 3, is suitable, e.g., for attachment of insulation panels or wall sheathing. The load application means 14 includes a large area head 32 and a shank member 33 projecting radially therefrom. A passageway 34 which includes an abutment for the trailing end portion 13 of the shank 2 of the attachment member 1, extends through both the head 32 and the shank member 33. The abutment is formed by a shoulder 35, which is provided in the interior of the passageway 34 and which is spaced from a free end 36 of the shank member 33, which is spaced from the large surface head 32, from about 8 mm to about 25 mm. In a head-side mouth region 37 of the passageway 34, flexible segments 38, projecting inwardly toward the center, are provided. The load application means 14 has overall a mushroom-shaped profile. Such load application means 14 is the subject matter of European publication EP-A-O 492 230 or a corresponding U.S. Pat. No. 5,171,118 which form an integral part of the present patent application.

The shank 2 of the attachment member 1 extends through the passageway 34 and is supported on the shoulder 35 with its plate spring-like collar 5. The bore section 39 of the passageway 34, which extends between the shoulder 35 and the free end 36 of the shank member 33, has a diameter somewhat smaller than the outer diameter of the trailing portion of the shank 2. Thereby, the bore section 39 serves as a guide for the shank 2 of the attachment member 1. With the shank 2 being lightly clamped in the bore section 39, the shank 2 and the mushroom-shaped load application means 14 can be pre-fabricated as a unit. A close guidance of the shank 2 also insures a good transmission for transverse forces.

FIG. 4 shows a mounting block which can be used, e.g., for attaching an insulation panel to a brick wall according to the inventive direct mounting method. The mounting block includes the attachment member 31, such as shown in FIG. 3, the drill 9, and the hand-held tool 15. As a hand-held tool 15, e.g., a percussion drilling tool can be used. For effecting the attachment process, the shank 10 of the drill 9 is inserted into the chuck 16 of the hand-held tool 15. Then, the attachment member 31 is pushed onto the drill 9 until the drill head 12 projects beyond the front end 6 of the shank 2 of the attachment member 31. Arrows P1 and P2 indicate the sequence of mounting of the drill 9 and the attachment member 31. Such pre-assembled mounting block, which consists of the hand-held tool 15, the drill 9 and the attachment member 31 is pressed against the constructional component or receiving material through the material of the insulation panel. Upon actuation of the hand-held tool 15, the drill 9 starts to form a receiving bore in the constructional component. As soon as the cutter-carrying leading end 6 of the shank 2 of the attachment member 31 contacts the component, it follows, by application of axial impacts, the drilling head 12 into the component. In this way, the receiving bore is continued to be formed, with the shank 2 of the attachment member 31 being driven into the constructional component. Because the size of the longitudinally slotted shank 2 is larger than the base diameter, it becomes radially compressed as it is being driven into the component. The hollow shank 2 of the attachment member 31 forms a radial guide for the drill 9. The shank 2, which is supported against an abutment, upon being driven into the component, pulls the load application means 14 into the material of the insulation panel until the large area head abuts the outer surface of the panel, advantageously in a flush manner.

FIG. 5 shows the attachment member according to FIG. 3 in a condition in which it is partially pulled-in into the material of the insulation panel P and is not completely anchored in a constructional component U, e.g., perforated or hollow brick masonry. It is clearly seen there that the drilling head 12 projects beyond the leading end 6 of the attachment member 31 which extends into the receiving bore A. The flexible segments 38 are pressed by the drill 9 into the interior of the passageway 34. The drill can be provided, as shown in the drawing, with a groove 17 which, upon withdrawal of the drill 9 out of the attachment member 31, engages the flexible segments 38 and pulls them out of the passageway 34. In this way, after the attachment, the segments 38 again extend toward the center and can serve as a backing for a subsequently applied plaster layer.

We claim:

1. An attachment member, comprising an axially extending tubular metallic shank (2) having an axial through-bore (3), an axially extending inner surface, an axially extending outer surface and an axially extending slot (8) formed in the shank (2) between the inner and outer surfaces thereof and extending along an entire length of the shank (2), said outer surface being smooth for the axial extent thereof, load application means (14) provided at a trailing, in a setting direction, end portion (13) of the shank (2), cutters (7) are provided at a leading end (6) of the shank (2) opposite said trailing end portion, said cutters extending continuously around the leading end, and the shank (2) has a trailing end opposite the leading end and has an outer diameter which narrows from the trailing end (4) thereof toward the leading end (6) thereof which carries the cutters (7).

2. An attachment member according to claim 1, characterized in that the shank (2) has, at the trailing end (14) thereof, a plate-spring-like collar (5) which extends substantially radially outwardly from the outer surface of the shank.

3. An attachment member according to claim 1 or 2, characterized in that a largest width (w) of said axial slot (8), measured along the inner surface of the shank (2), is in the range of 25 to 50% of an outer diameter (d) of the shank (2) in a region of the trailing end (4) thereof.

4. An attachment member according to claim 3, characterized in that the width of the slot (8) diminishes the trailing end (4) of the shank (2) to the leading end (6) thereof.

5. An attachment member according to claim 4, characterized in that the axial slot (8) is closed at the leading end (6) of the shank (2) with a weld point.

6. An attachment member according to claims 1 or 2, characterized in that the load application means (14) is formed of plastics and includes a base (22) and a substantially arched receiving clamp (23) projecting radially outwardly from the base (22), and the base (22) is provided with a through-bore (24) aligned with the through-bore (3) of the shank (2).

7. An attachment member according to claims 1 or 2, characterized in that the load application means (14) is formed of plastics and includes a large area head (32) and a shank member (33) projecting axially therefrom, the head portion (32) and the shank member (33) form a passageway (34) provided with an abutment (35) for a trailing end section of the shank (2) of the attachment member (31), and flexible locking elements (38) on said area head (32), projecting radially inwardly toward a center in a head-side mouth region (37) of the passageway (34).

8. An attachment member according to claim 7, characterized in that the abutment is formed by a shoulder (35) in the passageway (34) in the shank member (33) spaced from a free front end (36) of the shank member (33) toward the area head (32) by a distance (a) of about 8 mm to about 25 mm.

9. A method of anchoring an attachment member (1, 21, 31) in a receiving material where the attachment member is formed of an axially extending tubular shank having a trailing end and a leading end spaced axially from the trailing end with cutters extending continuously around the leading end, the shank having a through-bore extending between the trailing end and the leading end and an axially extending slot extending from an outer surface of the shank to the through-bore and extending from the trailing end to the leading end, the outer surface of the shank tapering inwardly from the trailing end to the leading end, comprising the steps of placing a drill (9) having a diameter smaller than a least inside diameter of the through-bore into a chuck (10) in a hand-held drilling tool capable of rotating the drill and transmitting axially directed blows, inserting the drill into the through-bore of the shank with a leading end of the drill projecting axially outwardly from the leading end of the shank and with the chuck bearing against the trailing end of the shank, placing the leading end of the drill against a receiving material, actuating the drilling tool for rotating the drill and drilling a receiving bore into the receiving material with the receiving bore having a diameter smaller than the least diameter of the shank, transmitting axially directed blows to the trailing end of the shank for driving the shank into the receiving bore and clamping the shank in the receiving bore, shaving surfaces of the receiving bore by the cutters on the leading end of the shank, and after completing the anchoring of the shank in the receiving bore, pulling the drill out of the through-bore.

10. A method, as set forth in claim 9, comprising the steps of rotating the drill and applying axial blows to the trailing end of the shank at the same time whereby axial displacement of the shank is separated from the rotating action of the drill.

* * * * *